No. 673,914. Patented May 14, 1901.
A. LEGG.
WATER OR HYDRAULIC ENGINE.
(Application filed Jan. 5, 1900.)
(Model.) 2 Sheets—Sheet 1.

WITNESSES:
Gustave Dieterich.
John Kehlenbeck.

INVENTOR
Albert Legg
BY
Harry van Ness Philip
ATTORNEY

THE NORRIS PETERS CO., PHOTO-LITHO., WASHINGTON, D. C.

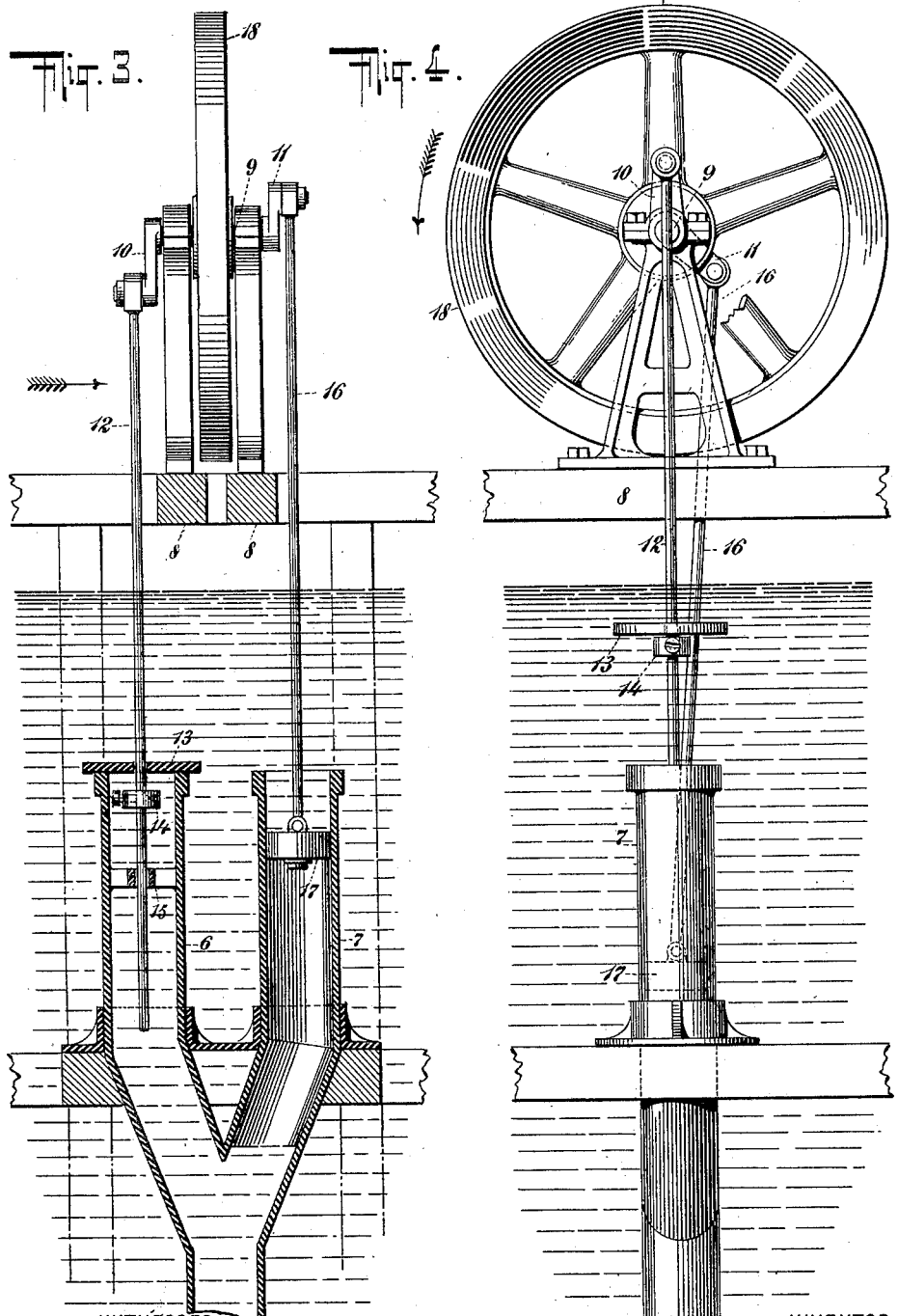

UNITED STATES PATENT OFFICE.

ALBERT LEGG, OF ALLENDALE, NEW JERSEY.

WATER OR HYDRAULIC ENGINE.

SPECIFICATION forming part of Letters Patent No. 673,914, dated May 14, 1901.

Application filed January 5, 1900. Serial No. 442. (Model.)

*To all whom it may concern:*

Be it known that I, ALBERT LEGG, a citizen of the United States of America, residing in the town of Allendale, county of Bergen, and State of New Jersey, have invented certain new and useful Improvements in Water or Hydraulic Engines, of which the following is a specification, reference being had therein to the accompanying drawings.

My invention relates to water or hydraulic engines; and its object is to provide means whereby power may be developed from a fall of water at or near the top of the fall and whereby power may be developed from the pull of the water instead of from the push thereof, as is usual in most water-engines and water-wheels.

To this end my invention consists of a device comprising a tube or pipe communicating at its upper or supply end with two upright hollow cylinders, combined with devices connected with said cylinders upon which the water supplied to the tube may operate and means of transmitting the power developed by said devices to the revolving shaft.

An application of my device is illustrated in the accompanying drawings, in which similar figures of reference indicate similar parts throughout the various views, of which—

Figure 1:
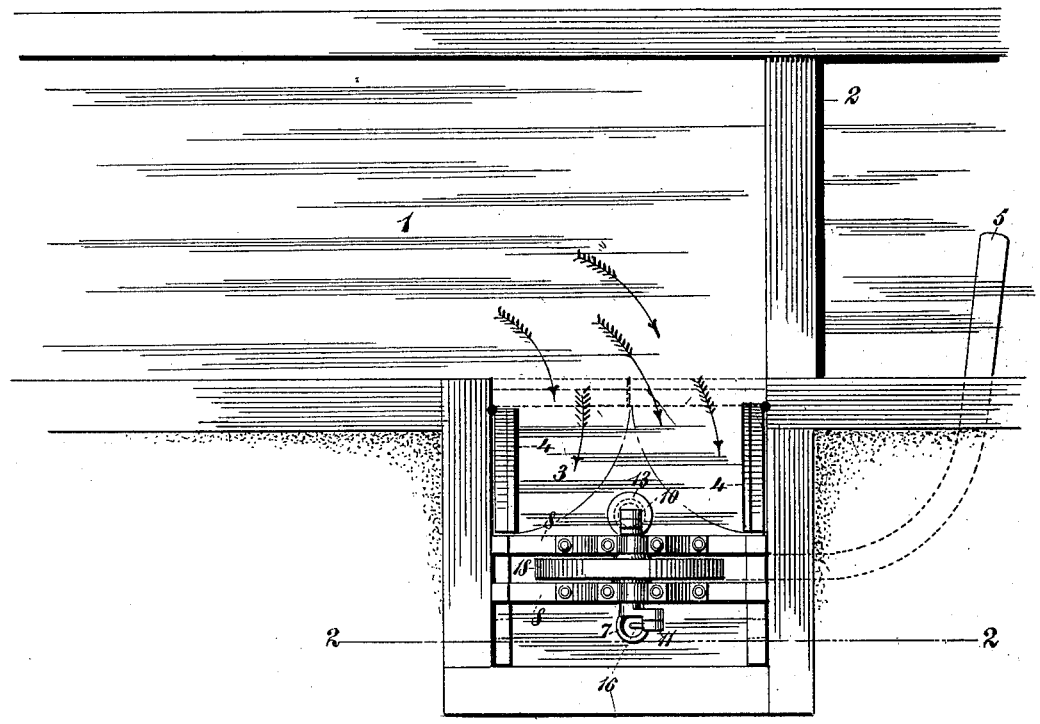
Figure 2:
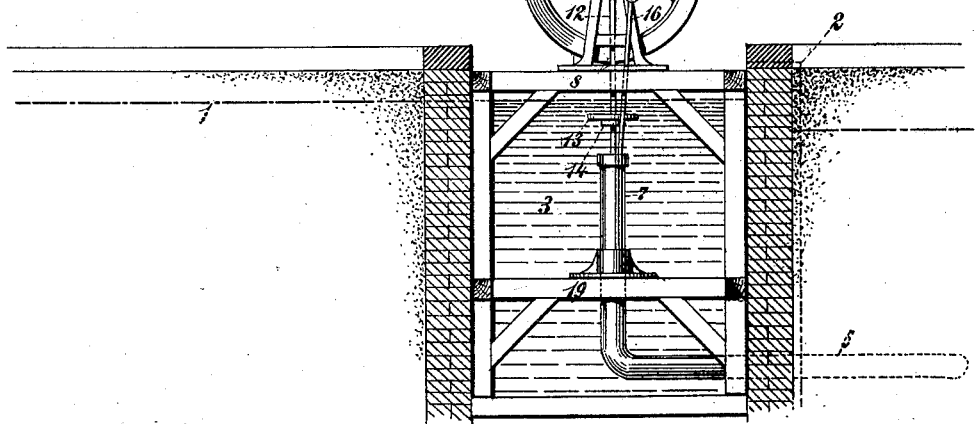

Figure 1 is a plan view. Fig. 2 is a sectional view on the line 2 2 of Fig. 1. Fig. 3 is a sectional view on the line 3 3 of Fig. 4, and Fig. 4 is an enlarged side view of the working parts.

1 represents a body of water, as a creek or river.

2 represents a dam adapted to divert the water 1 into the reservoir 3 when the gates 4 thereof are opened.

5 is a discharge-pipe sufficient to properly accommodate the amount of water coming into the reservoir 3 through the gate 4. At the upper end of discharge-pipe 5 are two upright hollow cylinders, respectively 6 and 7.

8 is a support for the shaft 9, upon which are two cranks 10 and 11. Operatively connected with crank 10 is a rod 12. Set upon said rod 12 is an abutment 14, which may be held in place by a set-screw, as shown in Fig. 3.

13 is a cover sufficient to cut off the supply of water to the pipe 5 through cylinder 6 when the same rests upon the top thereof and is loosely mounted upon said rod 12, so that when said rod 12 rises with crank 10 the abutment 14 will carry said cover 13. Said abutment 14 should be adjusted so that when the rod 12 is at its lowest limit of stroke the abutment 14 will be clear of the cover 13. Any convenient bearing, as 15, may be provided, whereby said rod 12 is guided so that cover 13 may reciprocate down upon and up from the top of said cylinder 6.

Operatively connected with crank 11 is rod 16, bearing at its lower end a piston 17, working in said cylinder 7.

18 is a wheel upon shaft 9, operating to balance the device, and 19 is the supporting-framework. If the wheel is turned so that the cover 13 is raised and water is allowed to enter the reservoir in quantities sufficient to maintain the water in the reservoir at or about the level of the cover 13 at its highest limit of stroke, the force of the water falling through cylinder 6 and discharge-pipe 5 will pull said cover down and the wheel 18 will thereafter continue to revolve so long as the said proper supply of water is maintained.

What I claim, and desire to secure by Letters Patent, is—

1. A water or hydraulic engine consisting of a pipe arranged to carry water from one level to a lower one, communicating at its upper end with each of two upright hollow cylinders, a piston adapted to operate in one of said cylinders, a cover adapted to close the upper end of the other of said cylinders, a revolving shaft having two cranks thereon, means whereby, as said piston descends, one of said cranks is pulled down, and whereby as said cover descends the other of said cranks is pulled down through a part of its downward stroke, and means of maintaining water at any desired level above the upper ends of said cylinders, substantially as described.

2. In a water or hydraulic engine, the combination of a pipe adapted to carry water down from one level to another, two upright hollow cylinders communicating with said pipe at the upper end thereof, a piston adapted to operate in one of said cylinders, a cover adapted to close the upper end of the other of said cylinders, a revolving shaft having two cranks thereon, means whereby said piston as it descends, pulls down one of said cranks, means whereby said cover as it descends pulls down the other of said cranks through a part of its downward stroke, and means of maintaining water at any desired
5 level above the upper ends of said cylinders, with a balance-wheel mounted on said shaft, substantially as described.

In witness whereof I hereunto affix my name, in presence of two witnesses, this 3d day of January, 1900.

ALBERT LEGG.

Witnesses:
J. B. MAXWELL,
J. F. BOUDREAU.